United States Patent [19]
Gaughan et al.

[11] Patent Number: 5,589,893
[45] Date of Patent: Dec. 31, 1996

[54] ON-SCREEN REMOTE CONTROL OF A TELEVISION RECEIVER

[75] Inventors: Kevin J. Gaughan, Arlington Heights; Thomas J. Zato, Inverness, both of Ill.

[73] Assignee: Zenith Electronics Corporation, Glenview, Ill.

[21] Appl. No.: 347,929

[22] Filed: Dec. 1, 1994

[51] Int. Cl.[6] .................................................. H04N 5/445
[52] U.S. Cl. .......................... 348/734; 348/569; 348/601; 345/146; 345/167
[58] Field of Search .................................... 348/553, 734, 348/601, 563, 569; 345/167, 160, 156, 157, 145, 146; H04N 5/445

[56] References Cited

U.S. PATENT DOCUMENTS

| | | | |
|---|---|---|---|
| 5,237,311 | 8/1993 | Mailey et al. | 345/167 |
| 5,367,316 | 1/1994 | Ikezaki | 348/734 |
| 5,371,553 | 12/1994 | Kawamura et al. | 347/734 |
| 5,412,776 | 5/1995 | Bloomfield et al. | 395/159 |
| 5,414,471 | 5/1995 | Saitoh et al. | 348/734 |

OTHER PUBLICATIONS

Computer Consulting & Training Inc., Microsoft Word 6.0 For Macintosh and Windows, No Date, pp. 3 & 6.

*Primary Examiner*—John K. Peng
*Assistant Examiner*—Jeffrey S. Murrell

[57] ABSTRACT

A television remote control system includes an on-screen cursor that is controllable by a viewer-operated remote transmitter. The remote transmitter includes a trackball that yields X,Y coordinate information responsive to rotational movement thereof and a switch that generates an activate signal responsive to depression of the trackball. A microprocessor in the television receiver controls the on-screen cursor display and updates the cursor position in response to transmitted IR X,Y position signals. A microprocessor in the remote transmitter monitors the trackball, the trackball operated switch and any other functional key switches. The television screen is divided into different control function areas and the areas are illuminated as each area is accessed by the cursor, i.e. as the designated cursor position impinges on the area. The cursor movement defined by the position signal is divided into a series of smaller movements to produce smooth cursor movements on the screen.

3 Claims, 5 Drawing Sheets

ON-SCREEN REMOTE CONTROL OF A TELEVISION RECEIVER

CROSS-REFERENCE TO RELATED APPLICATIONS

This invention is related to copending applications Ser. No. 347,747 and Ser. No. 474,573 which is a continuation-in-part of Ser. No. 347,930, filed of even date and all assigned to Zenith Electronics Corporation.

BACKGROUND OF THE INVENTION AND PRIOR ART

This invention relates generally to control of television receivers and specifically to means for providing on-screen control of television receiver functions. It is well known to control the operation of a television receiver by means of IR (infrared) control signals received from a remote transmitter. Some control systems include on-screen menu displays for accessing television functions such as volume, color tint, etc., and for facilitating receiver set up, initialization or the like. The user is presented with a variety of listed options that are overlayed on the normal video display and which are selectable by operation of the appropriate keys or buttons on a remote transmitter.

In the computer field, it is well known to move a "mouse" over a pad to control movement of a cursor that is displayed on the computer screen. X,Y displacement information, related to movement of the mouse, is supplied to the computer and results in corresponding movement of the on-screen cursor. One or more buttons on the mouse may be depressed by the user to "drag an icon" and to activate the function selected or accessed by the cursor. The mouse, which contains a trackball arrangement, is hard-wired to the computer.

The present invention relates to a system for controlling various functions of a television receiver with an on-screen cursor that is controlled by a trackball arrangement. Cursor movement is responsive to transmitted IR position signals.

In one aspect of the invention claimed in copending application Ser. No. 347,747 above, a hand-held remote transmitter provides trackball X,Y displacement information, keyboard entry information, means for monitoring the trackball and the keyboard and means for conveying control signal information, all in IR formats.

A feature of the invention involves using the trackball arrangement in conjunction with an activate key switch that is operated by depression of the trackball.

In another aspect of the invention, claimed herein, television operating functions are screen selectable by movement of the cursor adjacent to a specific operating function area on the viewing screen and the function is activated by operating a corresponding activate switch.

In another feature of the invention claimed herein, the displacement information from the trackball is sent by IR command in fixed time periods that define a maximum excursion of the cursor. The cursor movement is divided into smaller increments for producing a continuous display of cursor movement on the screen.

OBJECTS OF THE INVENTION

Accordingly, a principal object of the invention is to provide a novel television function control system.

Another object of the invention is to provide a simple hand-held remote transmitter for controlling the movements of a cursor that accesses operating functions of a television receiver by means of on-screen displays.

A further object of the invention is to provide an improved method of controlling the operation of a television receiver.

A feature of the invention is the provision of a remote control device that includes a trackball, for cursor movement control, as well as one or more function keys for television function control in conjunction with means for scanning or monitoring the trackball and the function keys and for transmitting appropriate IR coded signals responsive to activation thereof.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
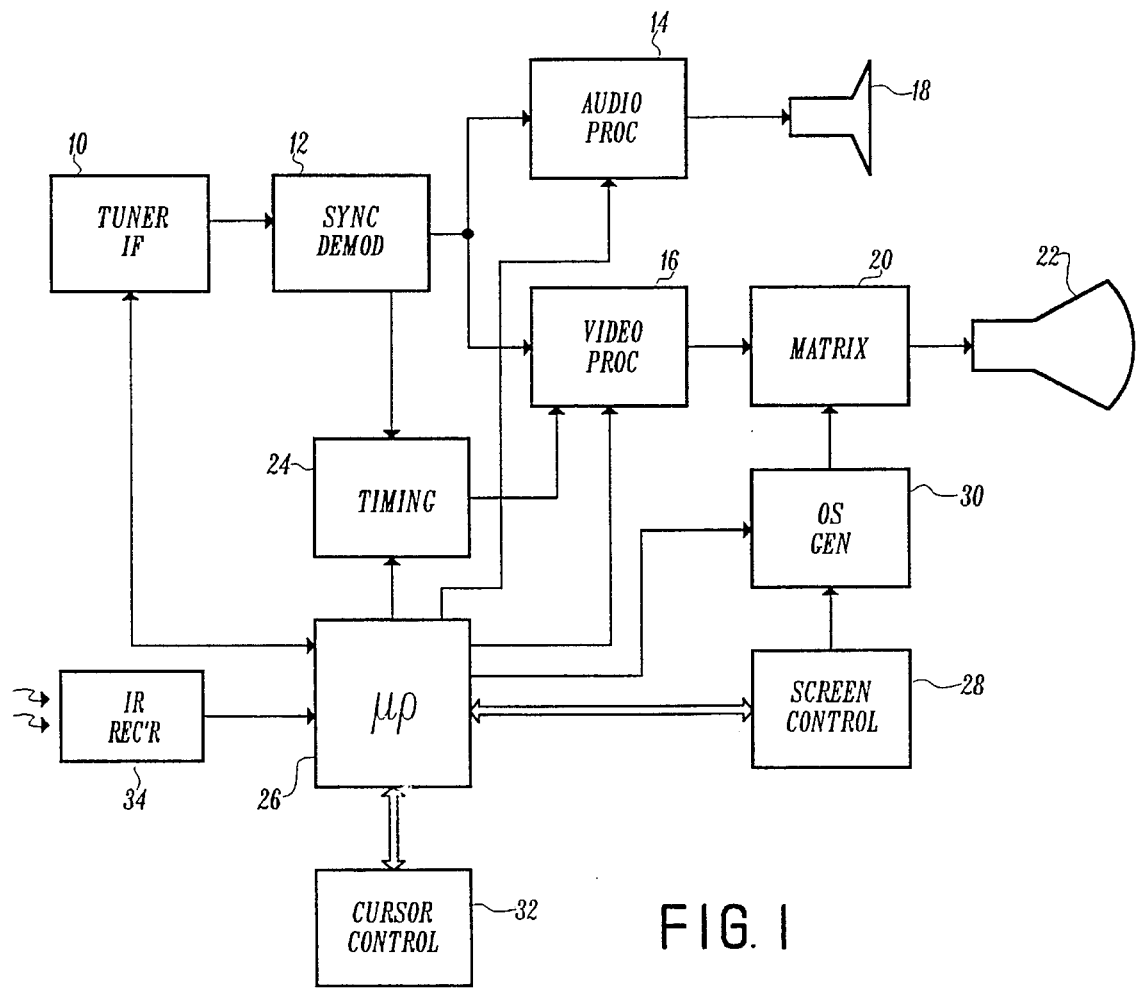
FIG. 1 is a simplified block diagram of a television receiver operated in accordance with the invention.

Referring to FIG. 1, a tuner-IF unit 10 is coupled to a synchronous demodulator 12 that supplies signals to an audio processor 14 and to a video processor 16. Audio processor 14 supplies audio signals to a conventional loudspeaker 18. Video processor 16 is coupled to a matrix circuit 20 that supplies video signals to a color cathode ray tube (CRT) 22. A timing circuit 24 receives information from synchronous demodulator 12 and provides timing signals to the various circuits, as required. For simplicity, only the connection to video processor 16 is shown. Timing circuit 24 is controlled by a microprocessor 26. microprocessor 26 is in bidirectional communication with tuner-IF unit 10 and controls audio processor 14, video processor 16 and an on-screen display generator 30. The on-screen display generator is coupled to matrix 20 and receives information from a screen control unit 28 that is coupled by a bidirectional data link to microprocessor 26. Similarly, a cursor control 32 is in bidirectional communication with microprocessor 26 and an IR receiver 34 supplies information to microprocessor 26. Those skilled in the art will recognize that the preceding block diagram is greatly simplified. The cursor control 32, screen control 28 and on-screen generator 30 are all well known individually (but not in this combination) and need not be explained in detail.

Figure 2:
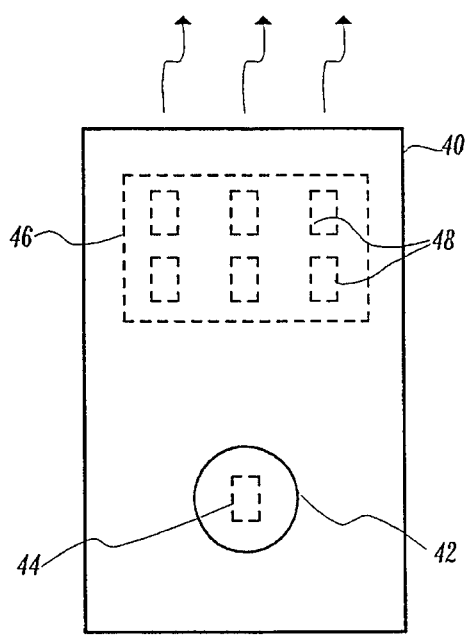
FIG. 2 shows a hand-held remote transmitter including a trackball and a number of function selection keys.

In FIG. 2, a hand-held remote control signal transmitter 40 is shown. It includes a trackball 42, which is also known in the art. The trackball includes means for producing X and Y displacement information responsive to rotational movement of the trackball. In accordance with the invention claimed in Ser. No. 347,747 above, a switch 44 is mounted beneath the trackball 42 and is operable by depression of the trackball. A keyboard 46 is shown with a number of keys 48, as is common in conventional hand-held remote transmitters that have various keys for controlling different television functions.

Figure 3:
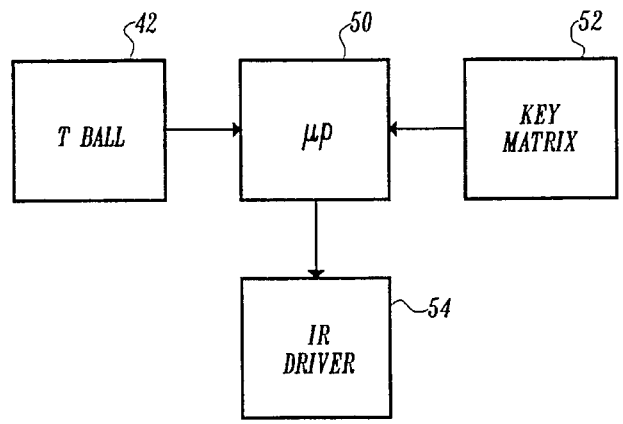
FIG. 3 is a simplified block diagram of the transmitter.

In FIG. 3, the operational components of remote transmitter 40 of FIG. 2 are illustrated. Included are a microprocessor 50, a trackball 42, a key matrix 52 and an IR driver 54. Microprocessor 50 is supplied with information from trackball 42 and from key matrix 52 (including switch 42), and in turn controls IR driver 54 for generating IR control signals in proper formats.

Figure 4:
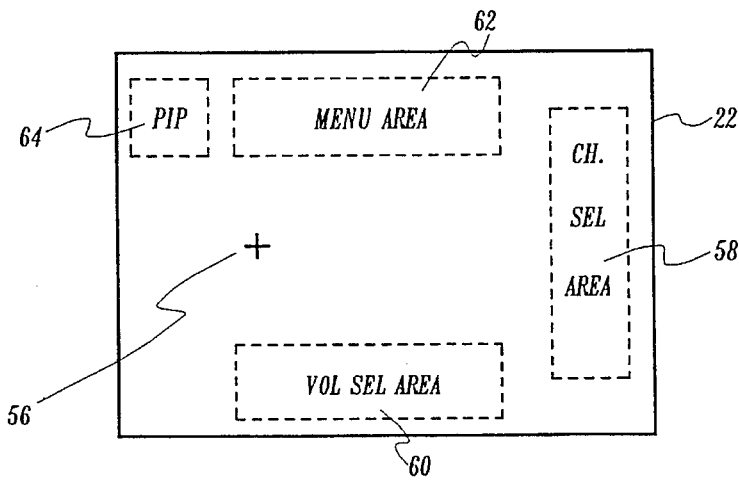
FIG. 4 shows a television viewing screen with television operation function selection areas.

In FIG. 4, the viewing screen of CRT 22 is shown with various portions thereof being assigned to particular television operating functions. These portions are enclosed by dashed lines to form, for example, a block 58 for channel selection, a block 60 for volume selection, a block 52 for menus and a block 64 for PIP (picture in picture). A cursor 56, in the form of a cross, is also illustrated. It should be noted that these portions or areas are generally peripherally arranged to leave the central viewing area of the screen relatively free. It will be appreciated that the various legends in the areas overlay the normal video display when television function selections are being made. Otherwise they are not displayed.

Figure 5:
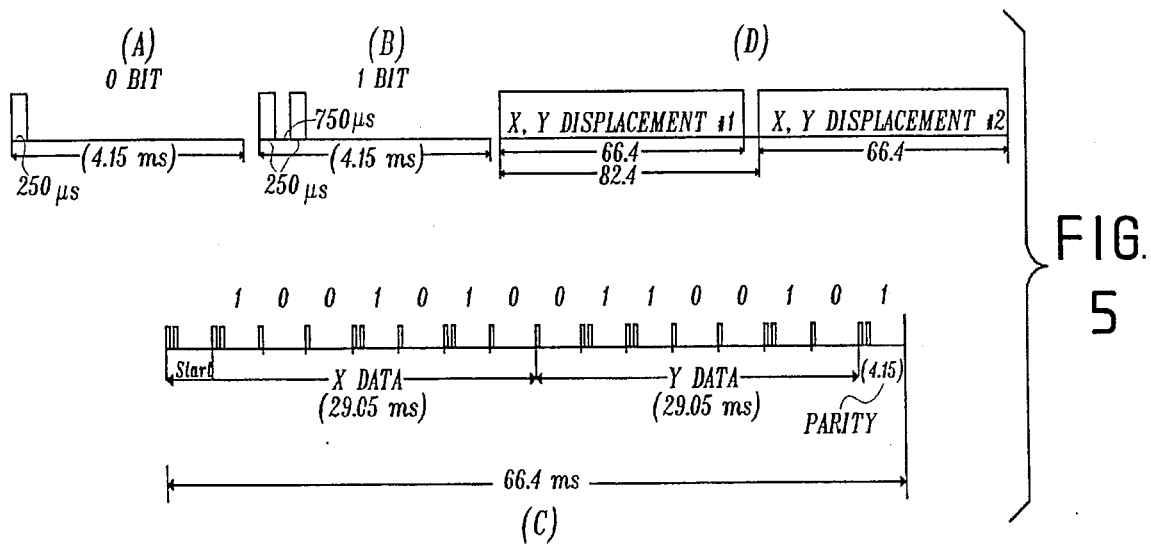
FIG. 5 shows a signal used to transmit trackball X,Y displacement data.

In FIG. 5, a data signal for conveying X and Y displacement data of trackball 42 is shown. The signal is 82.4 milliseconds (ms) long and includes a start bit consisting of two 250 microsecond (μs) pulses 750 μs apart in a time period of 4.15 ms, followed by 7 bits of X displacement data, 7 bits of Y displacement data and 1 bit of parity data. As shown in (A), a "0" bit consists of a 250 μs pulse at the beginning of the 4.15 ms interval. In (B), a "1" bit is shown consisting of two 250 μs pulses (750 μs apart) at the beginning of the 4.15 ms period. The 1 bit is also the equivalent of the start bit and the parity bit. (The parity bit may, of course, be a "0" rather than a "1".) The signal illustrated at (C) shows a start bit followed by an X displacement consisting of bits 1001010 representing 74 and a Y displacement consisting of bits 0110010 representing 50, and a parity bit of 1. In the preferred embodiment, the television receiver screen comprises a 272×195 pixel area. The trackball X,Y displacement data is cumulative and is measured from the upper left hand corner of the viewing screen (X=0, Y=0) with the X information being positive for horizontal movement to the right and the Y information being positive for vertical movement down. The receiver keeps track of new X,Y displacement data as they are received, and the cursor position is denoted on the pixel area. Subsequent displacement information updates the cursor position. Thus at all times the television receiver "knows" where the cursor is. The 7 bit displacement data limits the maximum value of the trackball (and cursor) excursion. For movement across the viewing screen, multiple signals (with multiple displacement data) may be needed.

To avoid jumpy movements of the cursor, the invention delays the received signal for a short period, divides the X and Y displacement movement into a smaller number of movements and controls the cursor with the smaller movements. In this manner a relatively smooth cursor movement is displayed on the viewing screen.

Figure 9:
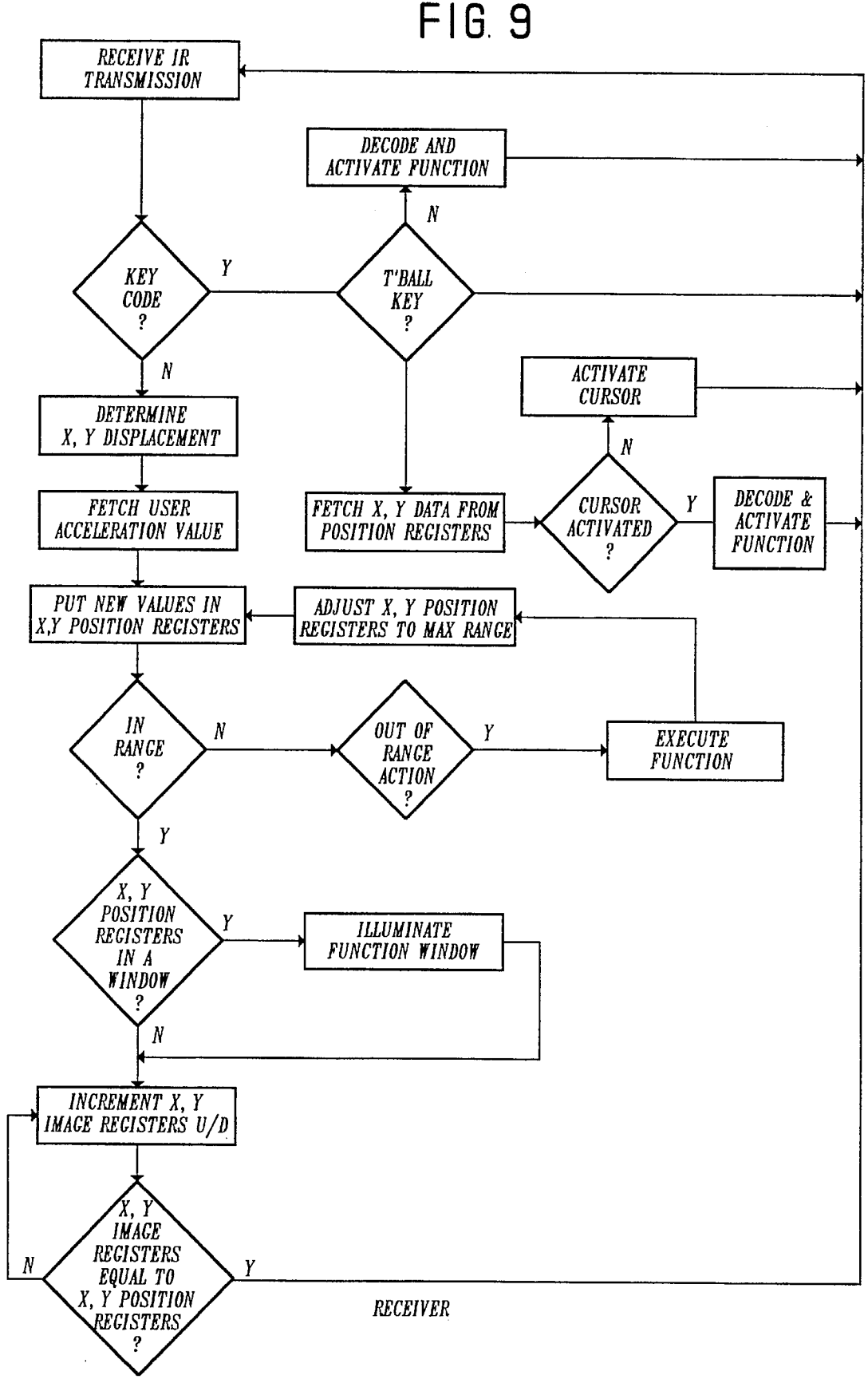
FIG. 9 is a flow chart illustrating operation of the remote control signal receiver of the invention.

As will be noted in the flow chart of FIG. 9, both cursor position registers and cursor image registers are maintained in the receiver. The image registers supply the information for illuminating the cursor on the screen whereas the position registers accept the new displacement data which is used to update the image registers. In the preferred embodiment of the transmitter, no cursor movement is represented by X=64, Y=64. In the transmitter, the range of trackball displacement is 128 units for X and 128 units for Y, with X=64 and Y=64 representing no movement. A +127 indicates 127−64=63 units of cursor movement on the screen. Similarly a 0 indicates 0−64=−64 units of cursor movement. It will be seen that for a screen of 272×195 pixels, more than one maximum trackball displacement is required to traverse the screen.

Figure 6:
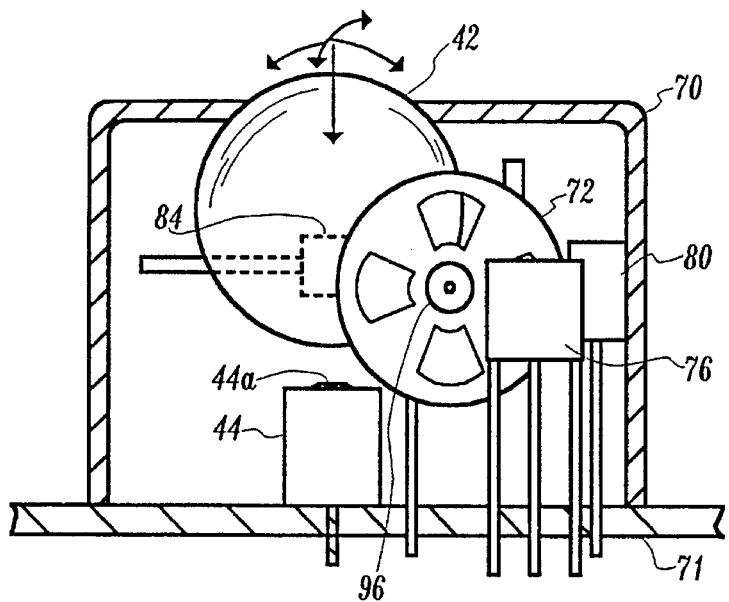
FIG. 6 is a simplified side view of a trackball unit.
Figure 7:
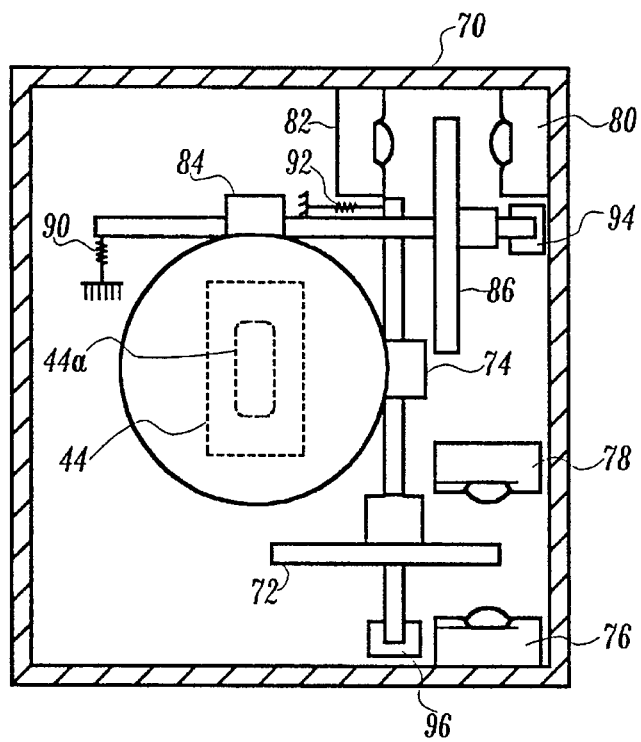
FIG. 7 is a top view of the trackball unit of FIG. 6.

In FIGS. 6 and 7, the trackball device is illustrated with trackball 42 being supported in a body 70 that is mounted on a printed circuit board 71. A pair of rollers 74 and 84 engage trackball 42, which is movable in any X,Y direction, with the rollers providing the X and Y displacement readout information by means of code wheels 72 and 86 which consist of alternating transparent and opaque areas. The code wheels are rotatable in response to movement of the respective rollers. The code wheels pass through spaced IR emitter-receptor pairs, i e an "X", IR emitter 76 and receptor pair 78, and a "Y" IR emitter 80 and receptor pair 82. Each receptor pair (78 or 82) consists of two displaced IR receivers in one package. The two IR receivers enable differentiation between + and − code wheel rotation in response to trackball movements. A switch 44 is mounted beneath trackball 42 and includes a button 44a which is activated when trackball 42 is depressed. This causes actuation of switch 44. As seen, one end of each code wheel axle is spring loaded by a spring (90, 92) and the other end is supported in a "loose" bearing (94, 96) which permits a slight displacement of the axle when the trackball is depressed to operate switch 44.

In copending application Ser. No. 474,573 above, a novel arrangement for operating switch 44 by depression of trackball 42 is described and claimed. In that arrangement, the trackball mechanism is "cantilevered" on a circuit board, which is deflectable responsive to pressures on the trackball.

In operation, the television receiver provides on-screen displays for various television receiver control functions, such as those illustrated in FIG. 4. The cursor display is developed in the television receiver and its position is monitored as described previously. In response to the (initial) activation signal from switch 44 of the remote transmitter of FIG. 2, cursor 56, in the preferred embodiment, is illuminated. In response to movements of the trackball 42 by the user, cursor 56 is moved over the viewing screen. As cursor 56 approaches a television control function portion or screen area, such as any of the screen areas 58, 60, 62 and 64, that area is illuminated and the options available for selection are displayed to the viewer. This procedure is software driven. The areas are highlighted in different colors for visual effect and to enable the viewer to associate different colors with different receiver functions. For example, blue may be used for volume control, yellow for the channel selection area, etc. As the viewer moves the cursor to the particular desired function in the area (a line item in a menu area or a channel number in the channel selection area, for example) depression of the trackball activates the switch 44 again and the activate signal will be received by the IR receiver 34 of the television receiver and result in execution of the selected control function. During trackball movement, the cursor position is correspondingly updated. As those skilled in the art will appreciate, with the arrangement, if it is so desired, a single trackball control on the remote transmitter may suffice for completely controlling all functions of the television receiver. For example, at initial start up, the trackball may be depressed to turn the television receiver on and to illuminate the cursor. Thereafter control of any function may be obtained in the manner just described by movement of the trackball to position the cursor in the selected area and by further activation of the switch 44. When the position of cursor 56 is outside of the selected area, the illuminated area is turned off. This particular illumination arrangement will be recognized to be a matter of design choice and the invention is not to be so limited.

Figure 8:
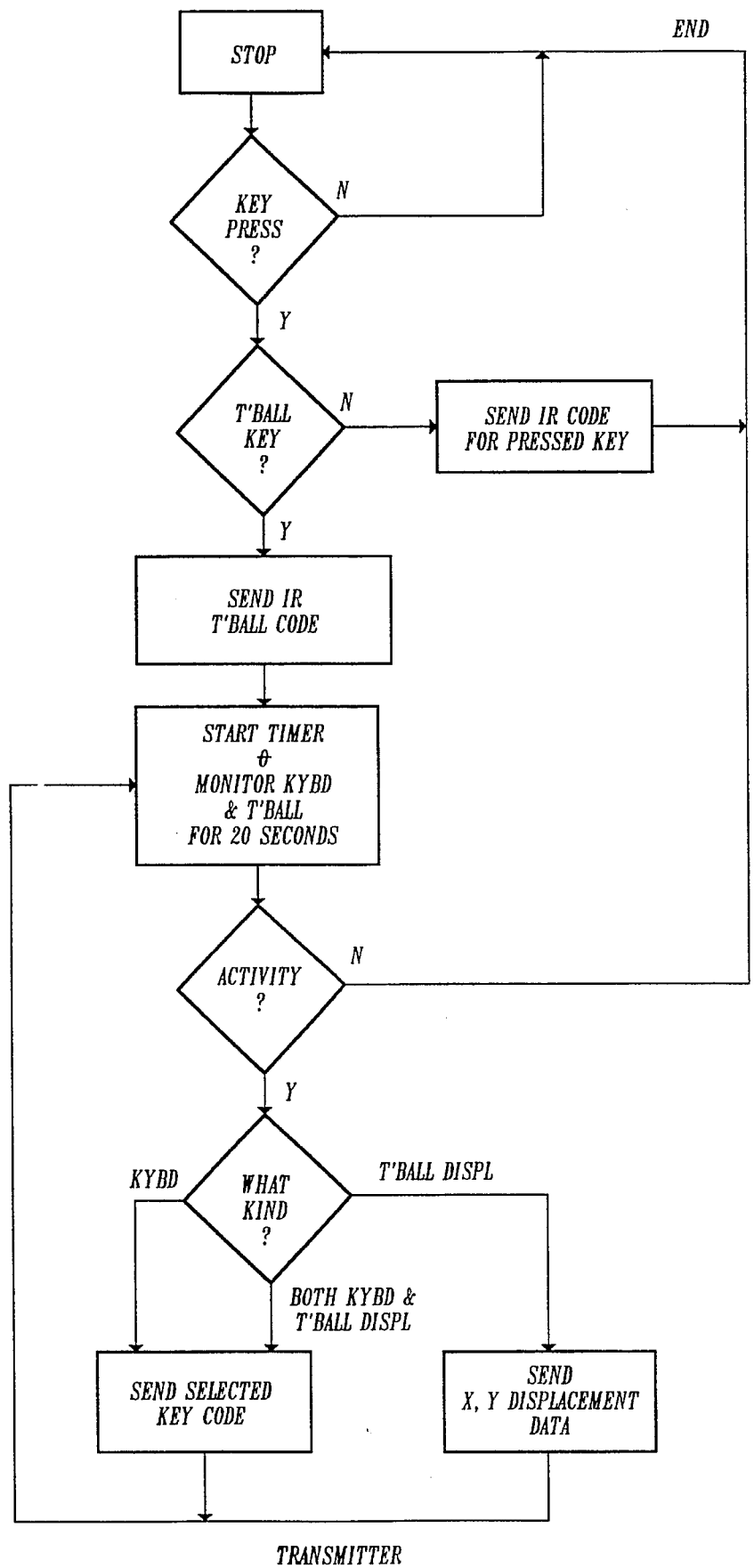
FIG. 8 is a flow chart illustrating operation of the remote control signal transmitter of the invention.

The flow charts of FIGS. 8 and 9 for the transmitter and receiver, respectively, illustrate operation of the system of the invention. In the transmitter, a key press is interrogated as to whether it is a trackball key (T'Ball) or a conventional function key. If the latter, the corresponding IR code is transmitted. If it was the T'Ball key, the T'Ball IR key code is sent to activate the cursor in the television receiver. A timer is started and the keyboard and T'Ball are monitored for 20 seconds. Activity during this period is interrogated with T'Ball movement being sent as IR displacement data and function key presses or simultaneous function key presses and T'Ball activity being sent as the selected key code. This favoring of the keyboard over the trackball prevents "casual" trackball movements from hindering normal remote control operation.

In FIG. 9, the receiver initially determines whether the cursor was active when the trackball key code is received and the X,Y data retrieved from the position registers. If so, the key code is decoded and the appropriate function actuated. If not, the cursor is activated and further T'Ball signals are awaited (i.e. X,Y displacement signals). When such are received, the X,Y displacement is determined, a user acceleration value (or sensitivity factor) is applied and the new values are placed in the position registers. The ranges are checked since large movement of the trackball (to a border area or the like) may indicate that a "scroll" type function should be executed. When the position registers indicate the cursor is in a "window" area of the screen, the area is illuminated. The image registers are incremented (and the cursor movement is visible). It will be appreciated that to produce a "smooth" cursor movement effect it may be that the receiver is already receiving the first part of the subsequent IR transmission before the cursor has reached the position determined by the previous IR transmission. When the image registers equal the position registers, execution of the designated function is carried out.

What has been described is a novel control system for controlling the functions of a television receiver by a remote transmitter. It is recognized that numerous changes in the described embodiment of the invention will be apparent to those skilled in the art without departing from its true spirit and scope. The invention is to be limited only as defined in the claims.

What is claimed is:

1. A method of remotely controlling a television receiver comprising:

assigning portions of a television viewing screen for controlling different television receiver functions;

selecting said different television receiver functions by means of a movable on-screen cursor;

moving said movable on-screen cursor responsive to IR X,Y displacement data based upon rotation of a trackball;

activating said different television receiver functions selected by said movable on-screen cursor via a switch operated by depression of said trackball; and selectively illuminating said portions of said television viewing screen as they are approached by said movable on-screen cursor.

2. The method of claim 1 further including transmitting said IR X,Y displacement data during a fixed time interval, said IR X,Y displacement data including a start bit and X and Y displacement bits for said trackball.

3. The method of claim 2 wherein said X and said Y displacement bits define cursor movement and further including dividing said cursor movement into a series of smaller movements for enhancing the display of said cursor movement on said television viewing screen.

* * * * *